United States Patent

Valentino

[11] Patent Number: 5,850,828
[45] Date of Patent: Dec. 22, 1998

[54] GRILL APPARATUS

[76] Inventor: Thomas J. Valentino, 6809 N. 56th Ave., Glendale, Ariz. 85301

[21] Appl. No.: 49,209

[22] Filed: Mar. 27, 1998

[51] Int. Cl.$^6$ ..................................................... A47J 37/00
[52] U.S. Cl. ..................... 126/25 R; 126/41 R; 126/201; 220/335; 248/364
[58] Field of Search ............................... 126/25 R, 25 A, 126/41 R, 9 R, 220, 273 R, 50, 201, 29, 30, 211; 220/335; 248/331, 364, 323, 123.2

[56] References Cited

U.S. PATENT DOCUMENTS

| | | | |
|---|---|---|---|
| 2,528,447 | 10/1950 | Miles | 126/41 R |
| 2,729,416 | 1/1956 | Waas | 220/335 |
| 4,076,008 | 2/1978 | Deaton | 125/25 R |
| 4,852,545 | 8/1989 | Sherman et al. | 126/41 R |
| 4,957,039 | 9/1990 | Reyes | 126/25 R |

*Primary Examiner*—James C. Yeung
*Attorney, Agent, or Firm*—H. Gordon Shields

[57] ABSTRACT

Barbeque apparatus includes a firebox cantilevered outwardly from a base and a counter-weighted lid pivotally secured to the firebox. The counter-weight for the lid is movable in a portion of the base. A counter-weighted grill is pivotally secured to the firebox. The barbeque apparatus may be conveniently operated by a user in a wheel chair. The firebox includes a heat shield to protect users.

15 Claims, 2 Drawing Sheets

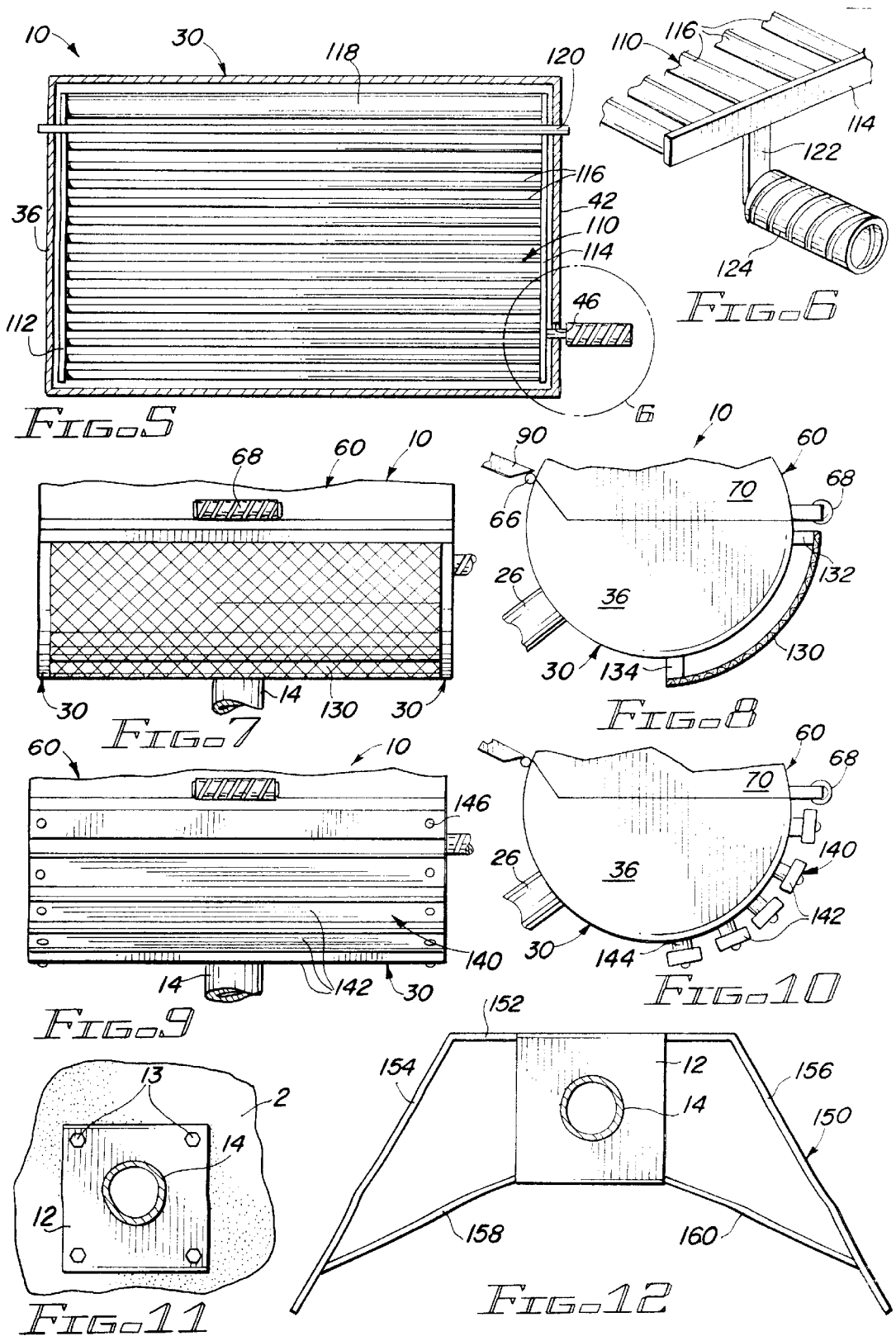

GRILL APPARATUS

BACKGROUND OF THE INVENTION

1. Field of the Invention

This invention relates to barbeques and, more particularly to barbeque apparatus having a cantilevered, counterweighted pivoting lid and a pivoting counterweighted grate within a base.

2. Description of the Prior Art

There are generally two types of barbeque grills, the first, and smallest, being a type that is generally considered a table-top barbeque. The table-top barbeque grill includes a firebox which may be conveniently disposed on a table, or the like, and a removable lid. Within the firebox there is a space for charcoal or for a gas pipe and a lid fits over the firebox and may be completely removed. A grill for supporting food to be cooked is disposed in the firebox.

The second type of barbeque is a larger barbeque that generally includes the elements of the above described barbeque, but includes a base which supports the firebox. The base supports the firebox off of the ground or surface. The barbeque may include wheels on the base for easy portability, or the base may be permanently fixed in place.

If the barbeque is fixed in place, there may be a removable lid to the firebox, or the barbeque may be without a lid. For the portable barbeques there is typically a lid. The lids are generally vented to allow for both smoke and steam to escape. In some cases, the lids may be pivoting, but they are generally not counterweighted. Otherwise, the lids are separable removable from the firebox.

SUMMARY OF THE INVENTION

The invention described and claimed herein comprises a barbeque apparatus which includes a base and a firebox cantilevered away from the face to provide easy accessability for a wheel chair, if desired. The barbeque apparatus includes a hinged and counterweighted lid which may be pivoted away from the firebox with relatively little effort. A grill in the firebox is also counterweighted to allow its pivoting with a minor amount of force or effort. Thus, for example, a wheel chair bound user may easily and conveniently use the barbeque apparatus. The counterweight for the lid is disposed in a vertical post which comprises part of the base.

Among the objects of the present invention are the following:

To provide new and useful barbeque apparatus;

To provide new and useful barbeque apparatus having a cantilevered firebox and a counterweighted lid secured to the firebox;

To provide barbeque apparatus having a firebox secured to a base and a counterweighted lid secured to the firebox and the counterweight is movable in a portion of the base;

To provide new and useful barbeque apparatus having a counterweighted grill pivotally secured to a firebox;

To provide new and useful barbeque apparatus having a firebox cantilevered outwardly from a supporting base structure; and To provide new and useful barbeque apparatus having a firebox cantilevered outwardly from a vertical support column and a lid pivotally secured to the firebox and a counterweight for the lid is movable vertically in the support column.

BRIEF DESCRIPTION OF THE DRAWING

FIG. 5 is a view in partial section taken generally along line 5—5 of FIG. 1.

FIG. 6 is an enlarged perspective view of a portion of the apparatus of the present invention taken generally from circle 6 of FIG. 5.

FIG. 7 is a front view of an alternate embodiment of the apparatus of the present invention.

FIG. 8 is a side view of the apparatus if FIG. 7.

FIG. 9 is a front view of another alternate embodiment of the apparatus of the present invention.

FIG. 10 is a side view of the apparatus of FIG. 9.

FIG. 11 is a view in partial section taken generally along line 11—11 of FIG. 1.

FIG. 12 is a view in partial section of an alternate embodiment of the apparatus of FIG. 11.

DESCRIPTION OF THE PREFERRED EMBODIMENT

Figure 1:
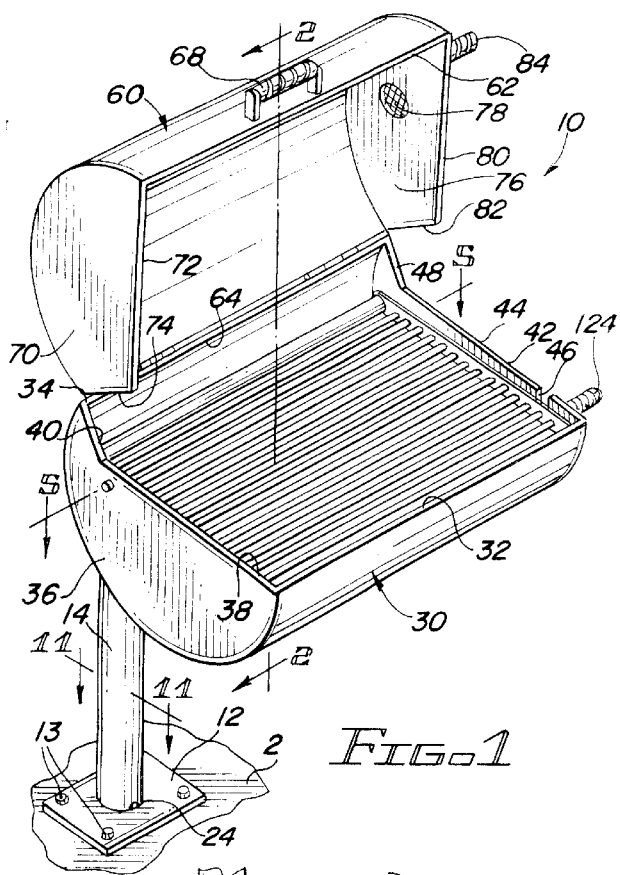
FIG. 1 is a perspective view of barbeque apparatus of the present invention.

FIG. 1 is a perspective view of grill apparatus 10 of the present invention disposed on a concrete pad 2. The grill apparatus 10 includes a base plate 12 which is secured to the concrete pad 2. Extending upwardly from the base plate 12 is a pipe cylinder 14. The pipe cylinder 14 comprises a support for a firebox 30. Hingedly secured to the firebox 30 is a lid 60.

Figure 2:
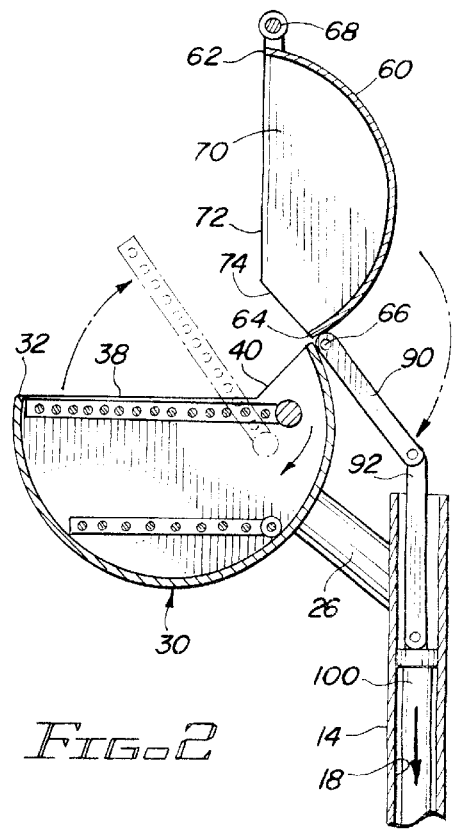
FIG. 2 is a view in partial section taken generally along line 2—2 of FIG. 1.
Figure 3:
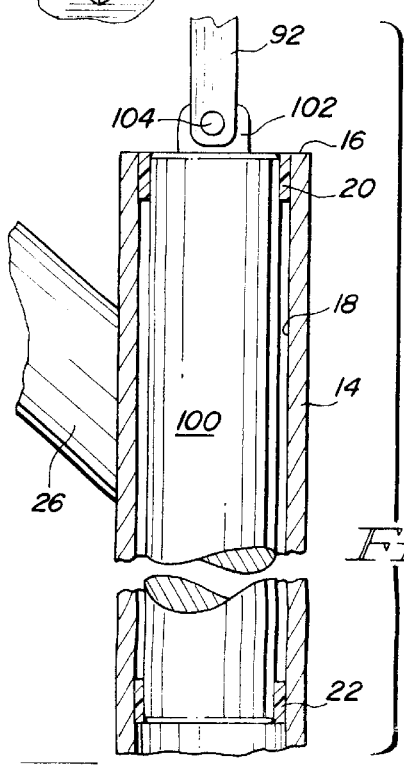
FIG. 3 is an enlarged view in partial section of a portion of the apparatus illustrated in and sequentially following FIG. 2.
Figure 4:
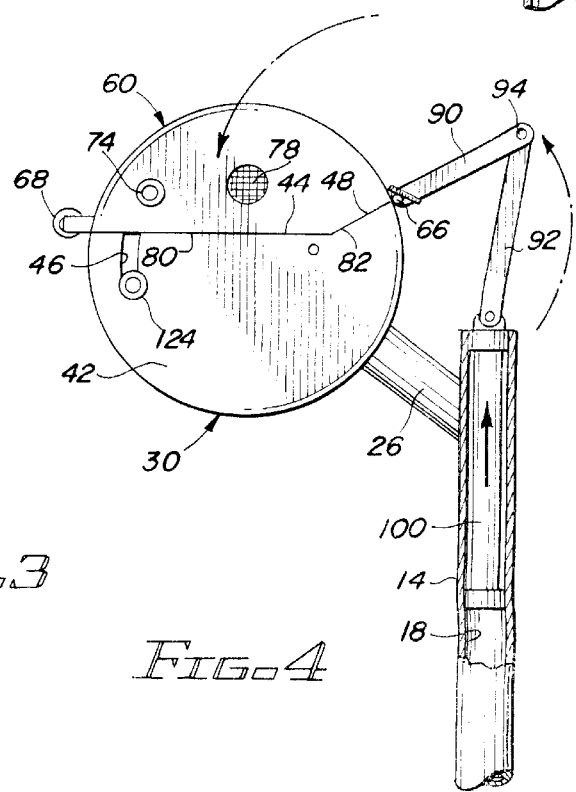
FIG. 4 is an enlarged side view in partial section of a portion of the apparatus of the present invention.

FIG. 2 is a view in partial section taken through the upper portion of the pipe cylinder 14, through the firebox 30, and showing the lid 60 in its open position. FIG. 3 is an end view of the firebox 30 with the lid 60 in its closed position and showing the upper portion of the cylinder 14 in partial section. FIG. 4 is an enlarged view in partial section of the upper portions of the pipe cylinder 14. For the following discussion of the grill apparatus 10, reference will primarily be made to FIGS. 1, 2, 3, and 4.

The grill apparatus 10 includes the base plate 12 which is secured to the concrete pad 2 by a plurality of appropriate fastener elements 13. Extending upwardly from the base plate 12, to which it is appropriately secured, as by welding, is a supporting cylindrical pipe or pipe cylinder 14. The pipe 14 extends upwardly from the base plate 12 and terminates in a top 16. Within the pipe 14 is a bore 18. In the bore 18 are two bushings, a top or upper bushing 20 and a lower or bottom bushing 22. The two bushings 20 and 22 are appropriately spaced apart.

Extending outwardly from the supporting pipe 14, and downwardly from the top 16 of the pipe 14 is a support bracket 26. A support bracket 26 extends upwardly and outwardly to provide cantilevered support for the firebox 30. The support bracket 26 is preferably a pipe which is appropriately secured, as by welding, to both the pipe 14 and the firebox 30.

At the juncture of the cylindrical pipe 14 and the plate 12 is a weep hole 24. The weep hole 24 communicates with the bore 18. Moisture condensing inside the cylinder 14, or rain, etc., flows out of the cylinder 14 through the weep hole 24.

The firebox 30 is a curved or rounded element which includes a front edge 32 and a rear edge 34. The firebox 30 includes two ends, an end 36 and an end 42. The ends 36 and 42 are appropriately secured to the main element which comprises the firebox 30.

The end 36 includes a front top edge 38 which extends rearwardly from the front edge 32. At the rear portion of the top front edge 38 is a rear upwardly sloping top edge 40. The edge 40 extends to the rear edge 34.

The end 42 includes a top front edge 44 which is aligned with the edge 38 and which extends rearwardly from the front edge 32. A slot 46 extends downwardly from the edge 44 and is curved to receive a handle 124 which will be discussed below. A sloping rear portion 46 comprises the rear portion of the front edge 44 and is generally parallel to the sloping top edge 40.

The lid 60 is appropriately hingedly secured to the box 30. The lid 60 includes a front edge 62 which is disposed on the front edge 32 of the firebox 30 when the lid is in its down position, as shown in FIG. 3. The lid 60 also includes a rear edge 64 which is disposed on the rear edge 34 of the firebox 30 when the lid is in its down position. The lid 60 and the firebox 30 are secured together by a hinge 66. The hinge 66 may comprise a pair of hinges spaced apart, or a single hinge, as desired.

A handle 68 is secured to the lid 60 adjacent to the front edge 52. The handle extends outwardly from the lid 60 and includes a wooden portion to insulate a user from the hot lid when the grill apparatus is in use.

The lid 60 also includes a pair of ends 70 and 76 which matingly engage the sides 36 and 42 of the firebox 30.

The end 70 includes a front edge 72 which is aligned with the front edge 38 of the side 36, and a rear sloping edge 74 which is aligned with the sloping edge 40 of the end 36.

The end 76 includes a vent 78 extending through it. The vent 78 may be covered with a wire mesh, is desired.

The end 76 also includes a front edge 80 which is aligned with the front edge 44 of the side 42, and a rear edge 82 which is aligned with the sloping rear edge 48 of the end 42. With the lid 60 in the down position, as shown in FIG. 3, the respective edges are appropriately aligned, as indicated.

A second insulated handle 84 is secured to the side 76 for convenience. Thus, a user, including a user in a wheel chair, may conveniently raise the lid 60 by either the front handle 68 or the side handle 84.

While the lid 60 is hingedly secured to the firebox 30, it is also counterweighted for ease in raising and lowering the lid relative to the firebox 30. The counterweight assembly includes a link 90 which is appropriately secured again as by welding, to the lid 60 adjacent to the hinge 66 and the rear edge 64. The link 90 is pinned to a link 92 by a pin 94. The link 92, remote from the pin 94, is pinned to a weight 100. The weight 100 is disposed in the bore 8 and moves in the bushings 20 and 22.

Extending upwardly at the top of the weight 100 is a tab 102. The tab 102 is a connecting element for the link 92. The link 92 is pivotally connected to the tab 102 by means of a pin 104.

The movement of the links 90 and 92 and the lid 60 is illustrated in FIGS. 2 and 3. In FIG. 2, the lid 60 is shown raised to its up position, with the weight 100 downwardly in the bore 18 to its lower most position. As the lid 60 is closed, as shown in FIG. 3, the counterweight 100 moves upwardly in the bore 18 and the links 90 and 92 move appropriately relative to each other and to the weight 100.

With the firebox 30 cantilevered outwardly from supporting pipe cylinder or post 14, a user in a wheel chair may have convenient access to the apparatus 10. With the lid 60 counterweighted, the lid 60 may be easily moved upwardly and downwardly with minimum effort, again very convenient for a user in a wheel chair.

FIG. 5 is a top view of a portion of the grill apparatus 10 taken generally along line 5—5 of FIG. 1 through the firebox 30 and disclosing a grill 110 in plan view. FIG. 6 is a perspective view, partially broken away, of a portion of the grill 110 taken generally from circle 6 of FIG. 5. For the following discussion of the grill 110, reference will primarily be made to FIGS. 5 and 6. Reference may also be made to FIGS. 1 and 2.

The grill 110 includes a pair of side frame members 112 and 114 to which are secured a plurality of spaced apart rods 116. The rods 116 are generally parallel to each other and generally perpendicular to the side frame members 14 to which they are appropriately secured. The rods 116 support food to be cooked.

The side frame members 112 and 114 are spaced slightly inwardly from the side walls 36 and 42, respectively, of the firebox 30. A counterweight 118 also extends between the frame members 112 and 114 rearwardly of a pivot rod 120. The pivot rod 120 extends through apertures in the side walls 36 and 42 of the firebox 30. The pivot rod 120 extends through the side frame members 112 and 114 and outwardly therefrom and comprises a rod on which the grill 110 pivots relative to the firebox 30.

Remote from the counterweight 118, and forwardly, toward the front of the firebox 30, is the handle 124. The handle 124 is disposed in the slot 46 in the end 42 when the grill is in the down position, as shown in FIG. 1 and 5. The handle 124 and the slot 46 is also shown in FIG. 3.

The handle 124 is connected to a downwardly extending arm 122 and comprises essentially an outwardly extending insulated leg. The downwardly extending arm 122, as shown in FIG. 6, is appropriately secured, as by welding, to the frame member 114. The outwardly extending handle 124 is generally perpendicular to the arm 122.

With the counterweight 118, the grill 110 may be raised upwardly, with a minimum of force, to provide access to the bottom of the firebox where coals, charcoal briquets, etc., may be placed prior to using the grill apparatus 30.

FIG. 7 is a front view of a portion of the apparatus 30 with a mesh heat shield 130 secured to the front of the firebox 30. FIG. 8 is a side view in partial section of the grill apparatus 10 showing the heat shield 130 in partial section. For the following discussion, reference will primarily be made to FIGS. 7 and 8.

The heat shield 130 comprises a curved mesh grill secured to the firebox 30 by brackets 132 and 134. The bracket 132 is the top bracket and bracket 134 is the bottom bracket. The mesh grill heat shield 130 is appropriately secured, as by welding to the brackets 132 and 134. The brackets 132 and 134 are appropriately secured, again preferably by welding, to the firebox 30.

The mesh grill heat shield 130 extends from the upper portion of the firebox 30, adjacent to the front edge 32 (see FIGS. 1 and 2) downwardly to about the bottom of the firebox 30. The heat shield 130 also extends nearly the full width of the firebox, as shown in FIG. 7.

An alternate embodiment heat shield 140 is shown in FIGS. 9 and 10. FIG. 9 is a front view of the apparatus I0 and FIG. 10 is a side view of the apparatus 10. For the following discussion, reference will primarily be made to FIGS. 9 and 10.

The heat shield 140 comprises a plurality of generally parallel wooden slats 142 appropriately secured to the firebox 30. Each slat 142 is spaced apart from the firebox 30 by a pair of spacers 144. Appropriately fasteners 146 are then used to secure slats 142 to both the spacers 144 and the firebox 130. The spacers 144 may simply be small sections of pipe appropriately secured, as by welding, to the firebox 30, or holes may be drilled in the firebox 130 to receive bolts or screws as fasteners 146 extend through the spacers and the screws are then extended to tapped apertures in the firebox 130.

FIG. 11 is a plan view in partial section through the cylinder support post or pipe 14. The pipe 14 is shown in partial section secured to the base plate 12. The base plate 12 is in turn secured to the concrete pad 2 by a plurality of fasteners 13. The plate 14 is preferably a square plate, and the fasteners 13, which may be bolts, etc., are disposed adjacent to the four corners of the plate 12. Such fastening system provides a relatively fixed orientation of the grill apparatus 10 and may be appropriate for a backyard patio situation for a home, or on a concrete pad in a playground, a campground, etc.

FIG. 12 is a plan view of an alternate base or support stand for the grill apparatus 10. Again, the pipe 14 is shown in partial section appropriately secured to the plate 12. However, the plate 12, instead of being relatively permanently affixed to the concrete pad, is appropriately secured to a support stand 150. The plate 12 may be welded to the stand 150 or it may be secured to the stand 150 by a plurality of fasteners, such as bolts, etc. (not shown).

The stand 150 includes a rear member 152 to which the plate is secured, and a pair of outwardly extending side members 154 and 156. A pair of inwardly extending front side members 158 and 160 extend inwardly to the plate 12 from the outwardly extending side members 154 and 156, respectively. The inwardly extending front side members 158 and 160 are appropriately secured to the front corners of the plate 12. The orientation of the side members 154, 156 and the front side members 158, 160 allows a wheel chair to be accommodated close to the firebox 30 for the convenience of a person using the wheel chair and the grill apparatus 10.

While the grill apparatus 10 may be permanently secured to a concrete pad, as shown in FIGS. 1 and 11, the grill apparatus 10 may also be secured to a stand, such as the stand 150, and disposed in an appropriate location, or moved, as desired.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. Grill apparatus comprising in combination:

a base;

a cylinder secured to the base and extending upwardly therefrom;

a bore in the cylinder;

a support bracket secured to the cylinder and extending outwardly therefrom;

a firebox secured to the support bracket remote from the cylinder;

a lid pivotally secured to the firebox;

counterweight means secured to the lid, including a counterweight movable in the bore in the cylinder and bushings for supporting the counterweight as it moves vertically in response to the pivoting of the lid; and grill means in the firebox for receiving food to be cooked.

2. The apparatus of claim 1 in which the counterweight means further includes a first link secured to the lid and a second link secured to the counterweight.

3. The apparatus of claim 2 in which the counterweight means further includes a first pin securing the first and second links together for relative movement and a second pin for pivotally securing the second link to the counterweight.

4. The apparatus of claim 1 in which the base comprises a pad fixed in place.

5. The apparatus of claim 1 in which the base comprises a stand to which the cylinder is secured.

6. The apparatus of claim 1 in which the lid includes a first end and a second end, and a handle for raising the lid is secured to the second end.

7. The apparatus of claim 1 in which the grill means includes;

a grill for supporting food to be cooked;

a pivot rod pivotally secured to the firebox and the grill is secured to the rod for pivoting relative to the firebox, a counterweight secured to the grill, and a handle for pivoting the grill relative to the firebox.

8. The apparatus of claim 7 in which the grill means further includes a first frame member and a second frame member, and the grill includes a plurality of rods secured to the first and second frame members.

9. The apparatus of claim 8 in which the pivot rod is secured to the first and second frame members between the counterweight and the plurality of rods.

10. The apparatus of claim 9 in which the firebox includes a first end and a second end, and the second end includes a slot for receiving the handle of the grill.

11. The apparatus of claim 10 in which the handle is secured to the second frame member.

12. The apparatus of claim 1 which further includes heat shield means secured to the firebox for preventing a user from contacting at least a portion of the firebox.

13. The apparatus of claim 12 in which the heat shield means includes a mesh screen.

14. The apparatus of claim 12 in which the heat shield means includes a plurality of spaced apart slats.

15. The apparatus of claim 14 in which the slats are made of wood.

\* \* \* \* \*